United States Patent
Gayer et al.

[11] Patent Number: 6,107,363
[45] Date of Patent: Aug. 22, 2000

[54] THERMOPLASTIC ELASTOMERS

[75] Inventors: Udo Gayer, Tamm; Thomas Schuh, Waiblingen, both of Germany; Vincenzo Arcella, Novara; Margherita Albano, Milan, both of Italy

[73] Assignees: Ausimont S.p.A., Milan, Italy; Daimler-Benz AG, Stuttgart, Germany

[21] Appl. No.: 09/098,306

[22] Filed: Jun. 18, 1998

[30] Foreign Application Priority Data

Jun. 20, 1997 [IT] Italy .................................. MI97A1468

[51] Int. Cl.[7] .................................. C08F 2/48; C08F 4/00
[52] U.S. Cl. .................. 522/116; 522/113; 522/131; 522/132; 522/117; 525/276; 525/263
[58] Field of Search .................. 522/117, 116, 522/113, 131, 132, 155, 156; 525/267, 263

[56] References Cited

U.S. PATENT DOCUMENTS

| | | | |
|---|---|---|---|
| 3,810,874 | 5/1974 | Mitsch et al. | 528/70 |
| 3,865,845 | 2/1975 | Resnick | 549/455 |
| 3,894,118 | 7/1975 | Aronoff et al. | 428/379 |
| 3,978,030 | 8/1976 | Resnick | 526/247 |
| 4,155,823 | 5/1979 | Gotcher et al. | 204/159.17 |
| 4,158,678 | 6/1979 | Tatemoto et al. | 260/884 |
| 4,176,027 | 11/1979 | Gotcher et al. | 204/159.19 |
| 4,353,961 | 10/1982 | Gotcher et al. | 428/380 |
| 4,487,882 | 12/1984 | Ueta et al. | 524/505 |
| 4,603,175 | 7/1986 | Kawachi et al. | 525/276 |
| 4,652,592 | 3/1987 | Kawashima et al. | 522/117 |
| 5,612,419 | 3/1997 | Arcella et al. | 525/252 |

FOREIGN PATENT DOCUMENTS

| | | |
|---|---|---|
| 0073087A1 | 3/1983 | European Pat. Off. . |
| 0076581A2 | 4/1983 | European Pat. Off. . |
| 0080187A2 | 6/1983 | European Pat. Off. . |
| 0 132 834 A2 | 2/1985 | European Pat. Off. . |
| 0444700A2 | 9/1991 | European Pat. Off. . |
| 0683186A1 | 11/1995 | European Pat. Off. . |
| WO 91/02770 | 3/1991 | WIPO . |
| WO 94/02185 | 2/1994 | WIPO . |

*Primary Examiner*—James J. Seidleck
*Assistant Examiner*—Sanza L. McClendon
*Attorney, Agent, or Firm*—Arent, Fox Kintner Plotkin & Kahn

[57] ABSTRACT

Manufactured articles obtainable from a composition consisting of:

1) 100 phr of a fluorinated thermoplastic elastomer having a block structure with at least a fluorinated polymeric segment of B type having elastomeric properties and at least a fluorinated polymeric segment of A type having plastomeric properties,
2) from 0.1 to 40 phr of a crosslinking agent able to give peroxidic crosslinking of fluoroelastomers;
  and subsequent irradiation of the manufactured article by GAMMA or BETA radiations.

21 Claims, No Drawings

THERMOPLASTIC ELASTOMERS

The present invention relates to fluorinated thermoplastic elastomers having improved sealing properties, in particular at high temperatures, at least up to 150° C.

As known, thermoplastic elastomers are block copolymers formed by at least a soft segment having elastomeric properties and by at least a hard segment having plastomeric properties. Such products combine therefore the properties typical of the conventional cured elastomers with those of the plastomers.

In comparison with the conventional elastomers, they do not require any curing process, wherefore they result easily processable and recyclable according to the techniques usually utilized for thermoplastic polymers, with clear both economic and ecologic advantages.

Fluorinated thermoplastic elastomers are known in the art. For instance in U.S. Pat. No. 4,158,678, which is herein incorporated by reference, block fluorinated polymers, formed by alternate hard and soft segments, of which at least one is fluorinated, are described. Such products are obtained by radical polymerization of fluorinated monomers in the presence of an iodinated chain transfer agent having the formula $RI_n$, wherein R is a fluorinated radical, optionally containing chlorine, having from 1 to 8 carbon atoms, and n is 1 or 2, thus obtaining a first fluorinated polymeric segment, with elastomeric or plastomeric characteristics depending on the monomeric composition, having an iodine atom on one or both end groups. On such segment other different fluorinated or non fluorinated segments are then grafted, considering that the terminal iodine atoms are susceptible of radical attack and can therefore produce the growth of a new polymeric chain. It is thus possible to obtain, for instance, fluorinated thermoplastic elastomers of the A-B-A type, wherein A is a plastomeric segment (for instance a homopolymer or copolymer deriving from tetrafluoroethylene and/or vinylidenefluoride), while B is an elastomeric segment (for instance a tetrafluoroethylene/vinylidene fluoride/hexafluoropropene copolymer. Other thermoplastic elastomers of this kind are described in EP 444,700.

A limit of such products consists in that the mechanical and elastic properties easily worsen when the temperature rises and result quite unsatisfactory already at 50° C. In particular the compression set values are high, such as to make the products unsuitable to the manufacture of sealing elements (for instance shaft seals or O-rings or the like) to be employed at high temperatures, as requested by the motor, aerospace, plant industry.

Fluorinated thermoplastic elastomers, having improved mechanical and elastic properties by the introduction in the polymeric chain of small amounts of a bis-olefin, are also known from U.S. Pat. No. 5,612,419. The resulting products are in particular characterized by improved mechanical properties and by particularly low compression set values in comparison with the fluorinated thermoplastic elastomers of the patents previously described.

New fluorinated thermoplastic elastomers are also known from EP patent 683,186, which have mechanical and elastomeric properties similar to the products of U.S. Pat. No. 5,612,419 but having in the chain instead of the bis-olefin, small amounts of a fluorinated olefin containing a terminal iodine atom.

However the sealing properties of the products mentioned above are not satisfactory at high temperatures, in particular at the temperature of 150° C.

The need was felt to have available thermoplastic elastomers with improved sealing properties at high temperatures, in particular the compression set (C set).

An object of the present invention are manufactured articles obtainable from a composition consisting essentially of:

1) 100 phr of a fluorinated thermoplastic elastomer having a block structure with at least a fluorinated polymeric segment of type B having elastomeric properties and at least a fluorinated polymeric segment of type A having plastomeric properties,
2) from 0.1 to 40 phr of a crosslinking agent able to give peroxidic crosslinking of fluoroelastomers; and subsequent radiation of the manufactured article by GAMMA radiations, from 1 to 50 Mrad, preferably from 1 to 30 Mrad, or BETA radiations from 10 to 500 KGy, preferably from 10 to 300 KGy.

Preferably the amount of the component 2) ranges from 1 to 10 phr.

The composition of the invention can contain other additives such as fillers, for instance carbon black, silica, stabilizers, antioxidants, pigments, thickeners, plastifiers, etc. The amount of these additives generally ranges from 0.5 to 40 phr, preferably from 1 to 20 phr.

The crosslinking agents which can be used are for instance: triallyl-cyanurate; triallyl-isocyanurate (TAIC); tris(diallylamine)-s-triazine; triallylphosphite; N,N-diallyl-acrylamide; fluorinated bis-olefins as defined hereinafter, N,N' bisallylbicycle-oct-7-ene-disuccinimide (BOSA); N,N, N'-tetraallyl-malonamide; trivinyl-isocyanurate; 2,4,6-trivinyl-methyltrisiloxane, etc. A crosslinking agent or a mixture of the crossliniking agents above mentioned can be utilized.

It has been founds that the compositions of the invention subjected to treatment with BETA or GAMMA radiations give a remarkable increase of the sealing properties, even at high temperatures up to 150° C. The effect is particularly meaningful when the thermoplastic elastomer contains as plastomeric block the one essentially formed by PVDF. In this case, it is sufficient a very low amount of radiations, for instance 1 Mrad of GAMMA rays, to obtain the improved sealing properties.

As preferred crosslinking agents, TAIC, 1,6 divinylper fluorohexane (bis-olefin), BOSA can be mentioned, which have the following structures:

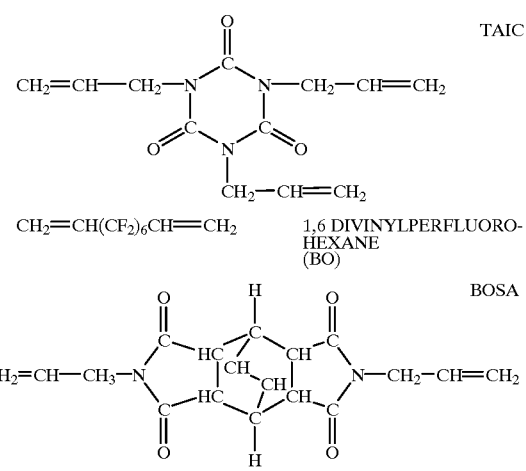

The fluorinated thermoplastic elastomer consists essentially of a block structure with at least a fluorinated polymeric segment of B type having elastomeric properties and at least a fluorinated polymeric segment of A type having plastomeric properties, optionally with at least one of the segments of A or B type, preferably B, wherein monomeric units are present deriving from a bis-olefin having the general formula:

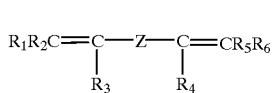 (IA)

wherein:

$R_1$, $R_2$, $R_3$, $R_4$, $R_5$, $R_6$, equal to or different from each other, are H or alkyls $C_1$–$C_5$; Z is an alkylene or cycloalkylene radical $C_1$–$C_{18}$, linear or branched, optionally containing oxygen atoms, preferably at least partially fluorinated, or a (per)fluoropolyoxyalkylenic radical.

In at least one among the A or B segment type, preferably B, monomeric units deriving from at least an iodinated olefin instead of the bis-olefin can be present, having the formula:

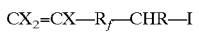 (I B)

wherein:

X is —H, —F, or —CH$_3$; R is —H or —CH$_3$; Rf is a (per)fluoro-alkylenic, linear or branched radical, optionally containing one or more atoms of ether oxygen, or a (per)fluoropoly oxyalkylenic radical.

In the formula (I A), Z is preferably a perfluoroalkylenic radical $C_4$–$C_{12}$, whereas $R_1$, $R_2$, $R_3$, $R_4$, R5, $R_6$ are preferably hydrogen.

When Z is a (per)fluoropolyoxyalkylenic radical, it has preferably the formula:

 (II A)

wherein: Q is an alkylenic or oxyalkylenic radical $C_1$–$C_{10}$; p is 0 or 1; m and n are integers such that the m/n ratio is in the range 0.2–5 and the molecular weight of said (per)fluoropolyoxyalkylenic radical is in the range 500 and 10,000, preferably 1,000–4,000. Preferably, Q is selected from: —CH$_2$OCH$_2$—; —CH$_2$O(CH$_2$CH$_2$O)$_s$CH$_2$—, s=1–3.

The bis-olefins of formula (IA) wherein Z is an alkylenic or cycloalkylenic radical can be prepared according to what described, for instance, by I. L. Knunyants et al in Izv. Akad. Nauk. SSSR, Ser. Khim., 1964(2), 384–6, while the bis-olefins containing the (per) fluoropolyoxyalkylenic sequences of formula (II) are described in U.S. Pat. No. 3,810,874.

The amount of units deriving from such bis-olefins is generally in the range 0.01–1.0%, preferably 0.03–0.5%, still more preferably 0.05–0.2% by mole, calculated with respect to the total amount of the other monomers of the elastomer or plastomer.

Iodinated olefins according to the formula (I B) can be selected in particular from the following classes:

(1)

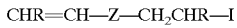 (II B)

wherein: R is —H or —CH$_3$; Z is a (per)fluoroalkylenic radical $C_1$–$C_{18}$, linear or branched, optionally containing one or more atoms of ether oxygen, or a (per) fluoropolyoxyalkylenic radical;

(2)

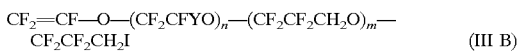 (III B)

wherein: Y is —F or —CF$_3$; m is an integer in the range 0–5; n is 0, 1 or 2.

As for the formula (II B), Z is preferably a perfluoroalkylenic radical $C_4$–$C_{12}$, or a (per)fluoropolyoxyalkylenic radical, as defined in formula (II A).

The unit amount deriving from the iodinated olefins of formula (I B) is generally in the range 0.01–1.0 by mole, preferably 0.03–0.5 by mole, still more preferably 0.05–0.2 by mole per 100 moles of the other basic monomeric units of the elastomer or of the plastomer.

The bis-olefins of formula (I A) and the olefins of formula (I B) are described respectively in U.S. Pat. No. 5,612,419 and EP 683,186 incorporated herein by reference.

The fluorinated elastomer and the fluorinated plastomer are obtained by (copolymerization of olefinic monomers. With fluorinated olefinic monomers are meant all the fluorinated products having at least a double bond C=C, optionally containing hydrogen and/or chlorine and/or bromine and/or iodine and/or oxygen, capable of producing (co)polymers in the presence of radical initiators. Among them we can cite: perfluoroolefins $C_2$–$C_8$, such as tetrafluoroethylene (TFE), hexafluoropropene (HFP), hexafluoroisobutene; hydrogenated fluoroolefins $C_2$–$C_8$, such as vinyl fluoride (VF), vinilydene fluoride (VDF), trif luoroethylene, perf luoroalkylethylene CH$_2$=CH—R$_f$, wherein R$_f$ is a perf luoroalkyl $C_1$–$C_6$; chloro- and/or bromo- and/or iodo-fluoroolefins $C_2$–$C_8$, such as chlorotrifluoroethylene (CTFE) and bromotrifluoroethylene; (per)fluoroalkylvinylethers (PAVE) CF$_2$=CFOR$_f$, wherein R$_f$ is a (per)fluoroalkyl $C_1$–$C_6$, for instance trifluoromethyl, bromodifluoromethyl or pentafluoropropyl; (per) fluoro-oxyalkylvinylethers CF$_2$=CF—OX, wherein X is a (per)fluoro-oxyalkyl $C_1$–$C_{12}$ having one or more ether groups, for instance perfluoro-2-propoxy-propyl; perfluorodioxoles.

Such fluorinated olefinic monomers can also be copolymerized with non fluorinated olefins $C_2$–$C_8$, such as ethylene, propylene, isobutylene.

The type B segments (elastomeric) can in particular be selected from the following classes (compositions expressed as % by mole):

(1) VDF-based copolymers, wherein VDF is copolymerized with at least a comonomer selected from: perfluoroolefins $C_2$–$C_8$; chloro- and/or bromo- and/or iodo-fluoroolefins $C_2$–$C_8$; (per)fluoroalkylvinylethers (PAVE) or (per)fluorooxyalkylvinylethers above defined; non fluorinated olefins (O1) $C_2$–$C_8$; typical compositions are the following: (a) VDF 45–85%, HFP 15–45%, TFE 0–30%; (b) VDF 50–80%, PAVE 5–50%, TFE 0–20%; (c) VDF 20–30%, O1 10–30%, HFP and/or PAVE 18–27%, TFE 10–30%;

(2) TFE-based copolymers, wherein TFE is copolymerized with at least a comonomer selected from: (per) fluoroalkylvinylethers (PAVE) or (per) fluorooxyalkylvinylethers above defined; hydrogenated fluoroolefins $C_2$–$C_8$; fluoroolefins $C_2$–$C_8$ containing clorine and/or bromine and/or iodine atoms; non fluorinated olefins (Ol) $C_2$–$C_8$; typical compositions are the following: (a) TFE 50–80%, PAVE 20–50%; (b) TFE 45–65%, Ol 20–55%, VDF 0–30%; (c) TFE 32–60%, Ol 10–40%, PAVE 20–40%.

The type A segments (plastomeric) can in particular be selected from the following classes (compositions expressed as % by mole):

(1) polytetrafluoroethylene or modified polytetrafluoroethylene containing small amounts, generally in the range 0.1–3%, preferably lower than 0.5%, of one or more comonomers such as, for instance: HFP, PAVE, VDF, hexafluoroisobutene, CTFE, perfluorolalkylethylenes;

(2) TFE thermoplastic polymers containing from 0.5 to 8% of at least a PAVE, such as, for instance, TFE and perfluoropropylvinylether and/or perfluoromethylvinylether copolymers, or also TFE/perf luoroalkylethylene copolymers;

(3) TFE thermoplastic polymers containing from 2 to 20% of a perfluoroolefin $C_3$–$C_8$, such as, for instance, FEP (TFE/HFP copolymer), to which other comonomers having a vinylether structure $CF_2$=CF—$OR_f$ or $CF_2$=CF—OX defined as above can be added in small amounts (lower than 5%);

(4) TFE or CTFE copolymers (40–60%) with ethylene, propylene or isobutylene (40–60%), optionally containing as third comonomer a (per)fluoroolefin $C_3$–$C_8$ or a PAVE, in amounts in the range 0.1–10%;

(5) polyvinylidenfluoride or modified polyvinylidenfluoride containing small amounts, generally comprised between 0.1 and 10%, of one or more fluorinated comonomers, such as hexafluoropropene, tetrafluoroethylene, trifluoroethylene.

The thermoplastic polymers of the classes above indicated, and in particular the TFE-based polymers, can be modified with (per)f luorinated dioxoles, according to the patents U.S. Pat. No. 3,865,845, U.S. Pat. No. 3,978,030, EP-73,087, EP-76,581, EP-80,187.

It has been found by Applicants that the mechanical and sealing properties of the manufactured articles, after GAMMA or BETA irradiation, can be further improved by subjecting the articles so obtained to a thermal treatment for about 1–6 hours at a temperature lower of about 10°–30° C. with respect to the melting temperature of the plastomer. This treatment can be called annealing.

Applicants have also found that the above properties are further increased if the above thermal treatment is carried on the manufactured articles before subjecting them to GAMMA or BETA irradiation.

The present invention will be now better illustrated by the following working examples which have a merely indicative purpose but not limitative of the scope of the present invention.

EXAMPLE 1

Preparation of the Thermoplastic Fluoroelastomer (FTPE) 1 Containing PVDF as Plastomeric Block A The thermoplastic fluoroelastomer having the structure A-B-A was prepared according to Example 1 of U.S. Pat. No. 5,612,419 but by modifying the VDF and TFE monomer feeding composition and using perfluoromethylvinylether (MVE) instead of HFP, to obtain a final composition of block B ($^{19}$F NMR analysis):

VDF 61 by mole
MVE 19% by mole
TFE 20% by mole

Moreover the polymer contains:

Bis-olefin 0.07% by mole.

The polymer Mooney viscosity is equal to 12 Mooney points (A-STM D 1646).

The final thermoplastic fluoroelastomer contains, in addition to the elastomeric B phase above specified, also a thermoplastic phase based on PVDF in the amount of 20% by weight on the total amount of the two phases and obtained as described in Example 1 of the above mentioned patent.

The FTPE 1 melting temperature is 160° C.

The material results to be under the form of thick powder coming from the coagulation and washing of the polymerization latex.

EXAMPLE 2

FTPE 2 Preparation Containing E/TFE/MVE as Plastomeric Block A

The thermoplastic fluoroelastomer with A-B-A structure was prepared as in Example 1 but modifying the amounts of the fed monomers so that to obtain the compositions indicated below.

In particular the fluoroelastomeric segment B has the following composition ($^{19}$F NMR analysis):

VDF 57% by mole
MVE 23% by mole
TFE 20% by mole
Bis-olefins 0.116 by mole
Mooney viscosity=36

The final thermoplastic fluoroelastomer contains, in addition to the elastomeric B phase, also a thermoplastic phase which instead of the PVDF of Example 1, has the following molar composition:

| ethylene | E 41% by mole |
| tetrafluoroethylene | TFE 50% by mole |
| perfluoromethylvinylether | MVE 9% by mole |

The amount of plastomeric phase is 25% by weight on the total amount of the two phases.

The FTPE 2 second melting temperature is 180° C.

The material results to be under the form of a thick powder coming from the coagulation and washing of the polymerization latex.

EXAMPLE 1A 100 phr of FTPE 1 polymer are mixed in a laboratory single screw extruder with 3 phr of TAIC (triallylisocyanurate) and then pelletized with the same equipment.

With the obtained formulation, 100×100×2 mm specimen have been compression molded for the mechanical tests: M100 means 100% elongation modulus, M200 means 200% elongation modulus, CR means stress at break, AR means elongation at break, Shore A hardness. Moreover disks have been molded (13 mm of diameter and 6 mm of thickness) for compression set tests at high temperature carried out according to VDA 675 216-B standard or ASTM D 395 method B. The sheets and the disks have been then irradiated with GAMMA rays (Co-60), with dosages 1, 5 and 10 Mrad.

The results are reported in Table 1 in which the comparison is carried out also with the pelletized polymer not containing crosslinking coagents and not submitted to crosslinking with radiations.

TABLE 1

|  | after molding in press (comparison) | after 3 phr TAIC | | |
|---|---|---|---|---|
|  |  | 1 Mrad | 5 Mrad | 10 Mrad |
| Mech. prop. after press 180° C. × 11 min (ASTM D 412-83) | | | | |
| M 100 (MPa) | 2.3 | 7.2 | 12.5 | 15.3 |
| M 200 (MPa) | 3 | 11.5 | — | — |
| CR (MPa) | 3.1 | 14.9 | 18.2 | 19 |
| AR % | 231 | 281 | 167 | 131 |
| Hardness points | 58 | 79 | 86 | 87 |
| C disk set (VDA*) 150° C. × (22 + 2) h % | 101 | 78 | 72 | 70 |

*The VDA standard is used in some sectors of automotive field as it results much more severe and meaningful of the corresponding ASTM method. In the case of the comparative Example of Table 1 the C set value according to ASTM at 150° C. × 24 h on O-ring is equal to 60%.

EXAMPLE 1B

One proceeds as in Example 1A except that the specimen and the disks are irradiated with BETA rays (4,5 MeV), with dosages 10.9; 28.4; 60.4; 120.9 KGy (1 Mrad=10 KGy)

The results are reported in Table 2 and the compression set data at the different temperatures in Table 3.

TABLE 2

Mechanical properties

|  | CR (MPa) | AR (%) | M50 (MPa) | M100 (MPa) |
|---|---|---|---|---|
| 10.9 KGy | 10.5 | 299 | 1.8 | 3.6 |
| 28.4 KGy | 12.7 | 208 | 2.4 | 5.5 |
| 60.4 KGy | 12.5 | 161 | 2.9 | 7.4 |
| 120.9 KGy | 12.9 | 131 | 3.6 | 9.6 |

TABLE 3

Compression set according to VDA standard

|  | 100° C. (%) | 125° C. (%) | 150° C. (%) |
|---|---|---|---|
| 10.9 KGy | 61 | 72 |  |
| 28.4 KGy | 48 | 58 |  |
| 60.4 KGy | 41 |  | 66 |
| 120.9 KGy | 36 |  | 60 |

EXAMPLE 2A

The FTPE 2 polymer is subdivided in 3 parts, each of them is mixed by means of a laboratory single screw extruder with different kinds of coagents in amounts of 3 phr. The coagents used are TAIC, BOSA and 1,6 divinylperfluorohexane (BIS-OLEFIN) (indicated with BO in the Tables). With the formulations obtained, 100×100×2 mm specimen have been compression molded for mechanical tests. Moreover disks have been compression molded for compression set tests at high temperature.

The specimen and the disks have then been irradiated with GAMMA rays (Co-60) with a 5 Mrad dosage.

The results are reported in Table 4 in which the comparison is carried out also with the pelletized polymer not containing crosslinking coagents. Mechanical properties and the compression set for all the samples are carried out also on non irradiated specimen and disks.

TABLE 4

|  | COMPARATIVE | 3 phr BOSA | 3 phr BISOLEFIN | 3 phr TAIC |
|---|---|---|---|---|
| Mech. prop. after press 180° C. × 11 min (ASTM D412-83) | | | | |
| M 100 (Mpa) | 2.8 | 3 | 2.4 | 2.9 |
| C.R. (Mpa) | 6.2 | 7.7 | 6.9 | 7 |
| A.R. % | 588 | 573 | 571 | 570 |
| Hardness points | 68 | 71 | 66 | 69 |
| C. set at 150° C. on disks | | | | |
| ASTM 24 h % | 98 | 102 | 99 | 101 |
| VDA(22 + 2) h % | 108 | 110 | 112 | 112 |
| Mech. prop after radiation with 5 Mrad of GAMMA rays | | | | |
| M 100 (Mpa) | 2.6 | 3.6 | 2.2 | 4.3 |
| C.R. (Mpa) | 7.8 | 12.7 | 7.7 | 14.1 |
| A.R. % | 422 | 383 | 556 | 283 |
| Hardness points | 67 | 71 | 62 | 74 |
| C. set at 150° C. on disks after radiation of 5 Mrad of GAMMA rays | | | | |
| ASTM 24h % | 75 | 66 | 87 | 59 |
| VDA(22 + 2) h | 102 | 95 | 93 | 98 |

EXAMPLE 4

One proceeds as in Example 3 except that the sheets and the disks are radiated with BETA rays (4,5 MeV), with dosages 50, 250, 500 KGy (1 Mrad=10 KGy).

The mechanical properties are reported in Tab. 5 and the compression set data measured at the different temperatures in 6.

TABLE 5

Mechanical properties

|  | C.R. (MPa) | A.R. (%) | M 50 (MPa) | M 100 (MPa) |
|---|---|---|---|---|
| BO | | | | |
| Not radiated | 6.9 | 671 | — | 2.4 |
| 50 KGy | 11.1 | 321 | 2.3 | 3.5 |
| 250 KGy | 10.1 | 160 | 2.8 | 4.9 |
| 500 KGy | 6.8 | 102 | 3.6 | 6.8 |
| BOSA | | | | |
| Not radiated | 7.7 | 573 | — | 3.0 |
| 50 KGy | 13.8 | 356 | 2.6 | 3.9 |
| 250 KGy | 13.5 | 141 | 4.3 | 8.0 |
| 500 KGy | 9.9 | 78 | 6.0 | — |
| TAIC | | | | |
| Not radiated | 7.0 | 570 | — | 2.9 |
| 50 KGy | 14.4 | 238 | 3.0 | 4.9 |
| 250 KGy | 8.7 | 89 | 5.0 | — |
| 500 KGy | 8.8 | 66 | 6.8 | — |

TABLE 6

| | Compression set VDA (22 + 2) h | |
|---|---|---|
| | 100° C. (%) | 125° C. (%) |
| BO | | |
| 50 KGy | 88 | 93 |
| 250 KGy | 61 | 71 |
| 500 KGy | 58 | 64 |
| BOSA | | |
| 50 KGy | 83 | 100 |
| 250 KGy | 63 | 79 |
| 500 KGy | 62 | 72 |
| TAIC | | |
| 50 KGy | 79 | 90 |
| 250 KGy | 63 | 73 |
| 500 KGy | 64 | 73 |

What is claimed is:

1. Manufactured articles obtained from a composition consisting of:
   1) 100 phr of a fluorinated thermoplastic elastomer having a block structure with at least a fluorinated polymeric segment (B) having elastomeric properties and at least a fluorinated polymeric segment (A) having plastomeric properties,
   2) from 0.1 to 40 phr of a crosslinking agent selected from the group consisting of triallyl-cyanurate; triallyl-isocyanurate (TAIC); tris(diallylamine)-s-triazine; triallylphosphite; N,N-diallyl-acrylamide; fluorinated bis-olefins; N,N'-bisallylbicyclo-oct-7-ene-disuccinimide (BOSA); N,N,N'-tetraallyl-malonamide; trivinyl-isocyanurate; and 2,4,6-trivinyl-methyltrisiloxane;
   and subsequent irradiation of the manufactured article by GAMMA radiations from 1 to 50 Mrad, or BETA radiations from 10 to 500 Kgy.

2. Manufactured articles according to claim 1 wherein the component 2) amount ranges from 1 to 10 phr.

3. Manufactured articles obtained from a composition consisting of:
   1) 100 phr of a fluorinated thermoplastic elastomer having a block structure with at least a fluorinated polymeric segment (B) having elastomeric properties and at least a fluorinated polymeric segment (A) having plastomeric properties,
   2) from 0.1 to 40 phr of a crosslinking agent selected from the group consisting of triallyl-cyanurate; triallyl-isocyanurate (TAIC); tris(diallylamine)-s-triazine; triallylphosphite; N,N-diallyl-acrylamide; fluorinated bis-olefins; N,N'-bisallylbicyclo-oct-7-ene-disuccinimide (BOSA); N,N,N'-tetraallyl-malonamide; trivinyl-isocyanurate; and 2,4,6-trivinyl-methyltrisiloxane and
   3) other additives selected from the group consisting of fillers, stabilizers, antioxidants, pigments, thickeners, and plastifiers;
   and subsequent irradiation of the manufactured article by GAMMA radiations from 1 to 50 Mrad, or BETA radiations from 10 to 500 Kgy.

4. Manufactured articles according to claim 1, wherein the crosslinking agents are selected from the group consisting of TAIC, 1,6 divinyl-perfluorohexane (bis-olefin); and BOSA.

5. Manufactured articles according to claim 1, wherein the fluorinated thermoplastic elastomer consists of a block structure with at least a fluorinated polymeric segment (B) having elastomeric properties and at least a fluorinated polymeric segment (A) having plastomeric properties, and in at least one among the (A) and (B) segments wherein monomeric unites are present, deriving from a bis-olefin having the general formula:

$$R_1R_2C{=}C{-}Z{-}C{=}CR_5R_6 \atop {\phantom{R_1R_2C{=}C}R_3 \phantom{{-}Z{-}}R_4}$$ (I A)

wherein:
   $R_1$, $R_2$, $R_3$, $R_4$, $R_5$, $R_6$, equal to or different from each other, are H or alkyls $C_1$–$C_5$; Z is an alkylene or cycloalkylene radical $C_1$–$C_{18}$, linear or branched, or a (per)fluoropolyoxyalkylenic radical.

6. Manufactured articles according to claim 5, wherein the bis-olefin is present in the fluorinated polymeric segment (B) having elastomeric properties.

7. Manufactured articles according to claim 1 wherein the fluorinated thermoplastic elastomer is formed by a block structure with at least a fluorinated polymeric segment (B) having elastomeric properties, and a least a fluorinated polymeric segment (A) having plastomeric properties and in at least one among the (A) and (B) segments wherein monomeric units are present deriving from at least one iodinated olefin having the formula:

$$CX_2{=}CX{-}R_f{-}CHR{-}I$$ (I B)

wherein:
   X is —H, —F, or —CH$_3$; R is —H or —CH$_3$; $R_f$ is a (per)fluoroalkylenic, linear or branched radical, or a (per)fluoropolyoxyalkylenic radical.

8. Manufactured articles according to claim 7, wherein the iodinated olefin is present in the fluorinated polymeric segment (B) having elastomeric properties.

9. Manufactured articles according to claim 5, wherein in the bis-olefin Z is selected from a perfluoroalkylenic radical $C_4$–$C_{12}$ and a (per)fluoropolyoxyalkylenic radical having the formula:

$$-(Q)_p-CF_2O-(CF_2CF_2O)_m(CF_2O)_n-CF_2-(Q)_p-$$ (II A)

wherein: Q is an alkylenic or oxyalkylenic radical $C_1$–$C_{10}$; p is 0 or 1; m and n are integers such that the m/n ratio is in the range of 0.2–5 and the molecular weight of said (per)fluoropolyoxyalkylenic radical is in the range of 500–10,000.

10. Manufactured articles according to claim 9, wherein the amount of units deriving from the bis-olefin is in the range of 0.01–1.0% by mole, calculated with respect to the total amount of the other monomers of the elastomer or the plastomer.

11. Manufactured articles according to claim 7, wherein the iodinated olefin is selected from the following classes:
(1)

$$CHR{=}CH{-}Z{-}CH_2CHR{-}I$$ (II B)

wherein: R is —H or —CH$_3$; Z is a (per)fluoroaolkylenic radical $C_1$–$C_{18}$, linear or branched, or a (per)fluoropolyoxyalkylenic radical;
(2)

$$CF_2{=}CF{-}O{-}(CF_2CFYO)_n{-}(CF_2CF_2CH_2O)_m{-} \atop CF_2CF_2CH_2I$$ (III B)

wherein: Y is —F or —CF$_3$; —m is an integer in the range 0–5; and is 0, 1 or 2.

12. Manufactured articles according to claim 11 wherein the amount of units deriving from the iodinated olefin is in the range 0.01–1.0 by mole per 100 moles of the other monomeric units of the elastomer or the plastomer.

13. Manufactured articles according to claim 1 wherein the fluorinated elastomer and the fluorinated plastomer are obtained by (co)polymerization of fluorinated olefinic monomers having at least a double bond C=C, able to produce (co)polymers in the presence of radical initiators.

14. Manufactured articles according to claim 13 wherein the fluorinated olefinic monomers are selected from the group consisting of (a) perfluoroolefins $C_2$–$C_8$; (c) hydrogenated fluoroolefins $C_2$–$C_8$; (b) chloro- and/or bromo- and/or iodo-fluoroolefins $C_2$–$C_8$; (d) (per)fluoroalkylvinylethers (PAVE) $CF_2$=$CFOR_f$, wherein $R_f$ is a (per)fluoroalkyl $C_1$–$C_6$; (e) (per)fluoro-oxyalkylvinylethers $CF_2$=CFOX, wherein X is a (per)fluoro-oxyalkyl $C_1$–$C_{12}$ having one or more ether groups; and (f) perfluorodioxoles.

15. Manufactured articles according to claim 13 wherein the fluorinated olefinic monomers are copolymerized in the presence of non fluorinated olefins $C_2$–$C_8$.

16. Manufactured articles according to claim 13 wherein the (B) segments (elastomeric) are selected from the following classes (compositions expressed as % by moles):
   (1) VDF-based copolymers, wherein VDF is copolymerized with at least a comonomer selected from the group consisting of: (a) perfluoroolefins $C_2$–$C_8$; (b) chloro- and/or bromo- and/or iodofluoroolefins $C_2$–$C_8$; (c) (per)fluoroalkylvinylethers (PAVE) or (per)fluorooxyalkylvinylethers; and (d) non fluorinated olefins (O1) $C_2$–$C_8$; and
   (2) TFE-based copolymers, wherein TFE is copolymerized with at least a comonomer selected from the group consisting of: (a) (per)fluoroalkylvinylethers (PAVE) or (per)fluorooxyalkylvinylethers; (b) hydrogenated fluoroolefins $C_2$–$C_8$; (c) fluoroolefins $C_2$–$C_8$ containing chlorine and/or bromine and/or iodine atoms; and (d) non fluorinated olefins (O1) $C_2$–$C_8$.

17. Manufactured articles according to claim 13 wherein the (A) segments (plastomeric) are selected from the following classes (compositions expressed as % by mole):
   (1) polytetrafluoroethylene or modified polytetrafluoroethylene with amounts in the range of 0.1–3% of one or more comonomers selected from the group consisting of HFP, PAVE, VDF, hexafluoroisobutene, CTFE, and perfluorolalkylethylenes;
   (2) TFE thermoplastic polymers containing from 0.5 to 8% of at least a PAVE, selected from the group consisting of TFE/perfluoropropylvinylether copolymers and/or TFE/perfluoromethylvinylether copolymers, or also TFE/perfluoroalkylethylene copolymers;
   (3) TFE thermoplastic polymers containing from 2 to 20% of a perfluoroolefin $C_3$–$C_8$, to which amounts lower than 5% of other comonomers having a vinylether structure $CF_2$=CF—$OR_f$ or $CF_2$=CF—OX can be added;
   (4) TFE or CTFE copolymers (40–60%) with ethylene, propylene or isobutylene (40–60%) and with (per)fluoroolefin $C_3$–$C_8$ or a PAVE (0–10%); and
   (5) polyvinylidenfluoride or modified polyvinylidenfluoride with amounts in the range of 0.1–10%, of one or more fluorinated comonomers selected from the group consisting of hexafluoropropene, tetrafluoroethylene, and trifluoroethylene.

18. Manufactured articles according to claim 17 wherein the thermoplastic polymers are modified with (per)fluorinated dioxoles.

19. Compositions consisting of:
   1) 100 phr of a fluorinated thermoplastic elastomer having a block structure with at least a fluorinated polymeric segment (B) having elastomeric properties and at least a fluorinated polymeric segment (A) having plastomeric properties,
   2) from 0.1 to 40 phr of a crosslinking agent selected from the group consisting of triallyl-cyanurate; triallyl-isocyanurate (TAIC); tris(diallylamine)-s-triazine; triallylphosphite; N,N-diallylacrylamide; fluorinated bis-olefins; N,N'-bisallylbicyclo-oct-7-ene-disuccinimide (BOSA); N,N,N'-tetraallyl-malonamide; trivinyl-isocyanurate; and 2,4,6-trivinyl-methyltrisiloxane.

20. Manufactured articles according to claim 1 wherein the manufactured articles before being subjected to irradiation treatment are subjected to a thermal treatment for about 1–6 hours at a temperature lower than about 10°–30° C. with respect to the melting point of plastomer (A).

21. Manufactured articles according to claim 1 wherein the manufactured articles after being subjected to irradiation treatment are subjected to a thermal treatment for about 1–6 hours at a temperature lower than about 10°–30° C. with respect to the melting point of plastomer (A).

* * * * *